US011715487B2

United States Patent
Chawla et al.

(10) Patent No.: US 11,715,487 B2
(45) Date of Patent: Aug. 1, 2023

(54) UTILIZING MACHINE LEARNING MODELS TO PROVIDE COGNITIVE SPEAKER FRACTIONALIZATION WITH EMPATHY RECOGNITION

(71) Applicant: Accenture Global Solutions Limited, Dublin (IE)

(72) Inventors: Mohit Chawla, New Delhi (IN); Balaji Janarthanam, Chennai (IN); Dinesh Vijayakumar, Bengaluru (IN); Sanjay Tiwari, Bengaluru (IN); Ashwini Purushothaman, Chennai (IN); Bhavika Sehgal, Ludhiana (IN); Rajesh Gala, Mumbai (IN); Saran Prasad, New Delhi (IN); Vinu Varghese, Bangalore (IN); Mohit Mahajan, Gurugram (IN); Badarayan Panigrahi, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 188 days.

(21) Appl. No.: 17/218,952

(22) Filed: Mar. 31, 2021

(65) Prior Publication Data
US 2022/0319535 A1 Oct. 6, 2022

(51) Int. Cl.
*G10L 25/63* (2013.01)
*G06F 40/30* (2020.01)
(Continued)

(52) U.S. Cl.
CPC .............. *G10L 25/63* (2013.01); *G06F 40/30* (2020.01); *G10L 17/02* (2013.01); *G10L 17/16* (2013.01); *G10L 21/0272* (2013.01); *G10L 25/24* (2013.01)

(58) Field of Classification Search
CPC ......... G10L 25/63; G10L 17/02; G10L 17/16; G10L 21/0272; G10L 25/24; G06F 40/30
See application file for complete search history.

(56) References Cited

U.S. PATENT DOCUMENTS

| 7,295,970 B1 | 11/2007 | Gorin et al. |
| 2012/0260201 A1* | 10/2012 | Ganesh .............. G06Q 30/0201 715/764 |

(Continued)

FOREIGN PATENT DOCUMENTS

WO 2020190395 A1 9/2020

OTHER PUBLICATIONS

Bassiou, N., Moschou, V., & Kotropoulos, C. (2010). Speaker diarization exploiting the eigengap criterion and cluster ensembles. IEEE transactions on audio, speech, and language processing, 18(8), 2134-2144. (Year: 2010).*

(Continued)

*Primary Examiner* — Bhavesh M Mehta
*Assistant Examiner* — Philip H Lam
(74) *Attorney, Agent, or Firm* — Harrity & Harrity, LLP

(57) ABSTRACT

A device may receive audio data identifying a plurality of speakers and may process the audio data, with a plurality of clustering models, to identify a plurality of speaker segments. The device may determine a plurality of diarization error rates for the plurality of speaker segments and may identify a plurality of errors in the plurality of speaker segments. The device may select rectification models to rectify the plurality of errors and may segment and/or re-segment the audio data with the rectification models to generate re-segmented audio data. The device may determine a plurality of modified diarization error rates for the plurality of speaker segments based on the re-segmented audio data and may select one of the plurality of speaker (Continued)

segments based on the plurality of modified diarization error rates. The device may calculate an empathy score based on the selected speaker segment and may perform actions based on the empathy score.

20 Claims, 10 Drawing Sheets

(51) Int. Cl.
  *G10L 17/16* (2013.01)
  *G10L 21/0272* (2013.01)
  *G10L 17/02* (2013.01)
  *G10L 25/24* (2013.01)

(56) References Cited

U.S. PATENT DOCUMENTS

| | | | | |
|---|---|---|---|---|
| 2016/0217793 | A1* | 7/2016 | Gorodetski | G10L 17/04 |
| 2016/0283185 | A1* | 9/2016 | McLaren | G10L 25/54 |
| 2018/0075860 | A1* | 3/2018 | Parada | G10L 15/04 |
| 2019/0158671 | A1* | 5/2019 | Feast | G06Q 10/10 |
| 2019/0253558 | A1* | 8/2019 | Haukioja | G10L 15/22 |
| 2019/0304470 | A1* | 10/2019 | Ghaemmaghami | G10L 17/04 |
| 2019/0385597 | A1 | 12/2019 | Katsamanis et al. | |
| 2020/0020454 | A1* | 1/2020 | McGarvey | G06Q 30/0282 |
| 2020/0051558 | A1* | 2/2020 | Yeon | G06F 3/167 |
| 2020/0075028 | A1* | 3/2020 | Lesso | G10L 17/00 |
| 2020/0075040 | A1* | 3/2020 | Provost | G06N 3/0454 |
| 2020/0089767 | A1* | 3/2020 | Ni | G06Q 30/016 |
| 2020/0279279 | A1* | 9/2020 | Chaudhuri | G10L 25/63 |
| 2021/0280078 | A1* | 9/2021 | Quan | G16H 50/70 |
| 2021/0306457 | A1* | 9/2021 | Krishnan | G06F 40/30 |
| 2021/0344636 | A1* | 11/2021 | Martin | G06F 40/253 |
| 2022/0122615 | A1* | 4/2022 | Chen | G10L 17/16 |

OTHER PUBLICATIONS

Redonnet, S., & Cunha, G. (2015). An advanced hybrid method for the acoustic prediction. Advances in Engineering Software, 88, 30-52. (Year: 2015).*
Lopez-Otero, P., Docio-Fernandez, L., & Garcia-Mateo, C. (Mar. 2010). Novel strategies for reducing the false alarm rate in a speaker segmentation system. In 2010 IEEE International Conference on Acoustics, Speech and Signal Processing (pp. 4970-4973). IEEE. (Year: 2010).*
Xiao, B., Georgiou, P. G., Imel, Z. E., Atkins, D. C., & Narayanan, S. S. (Sep. 2013). Modeling therapist empathy and vocal entrainment in drug addiction counseling. In Interspeech (pp. 2861-2865). (Year: 2013).*
Anguera, X., Bozonnet, S., Evans, N., Fredouille, C., Friedland, G., & Vinyals, O. (2012). Speaker diarization: A review of recent research. IEEE Transactions on audio, speech, and language processing, 20(2), 356-370. (Year: 2012).*
(Zhou, L., Gao, J., Li, D., & Shum, H. Y. (2020). The design and implementation of xiaoice, an empathetic social chatbot. Computational Linguistics, 46(1), 53-93.) (Year: 2020).*
(Unit, R. H. (2006). Empathy in health care providers-validation study of the Polish version of the Jefferson Scale of Empathy. Advances in medical sciences, 51, 219-225.) (Year: 2006).*
Shum, Stephen H., et al., "Unsupervised Methods for Speaker Diarization: An Integrated and Iterative Approach," IEEE Transactions on Audio, Speech and Language Processing, 2013, 14 pages.
Zhang, Xiao-Lei, "Multilayer Bootstrap Network for Unsupervised Speaker Recognition," 2015, 5 pages.
Ning, Huazhong, et al., "A Spectral Clustering Approach to Speaker Diarization," 4 pages.
Wang, Quan, et al., "Speaker Diarization With LSTM," 2018, 5 pages.
Luque, J., et al., "On the use of Agglomerative and Spectral Clustering in Speaker Diarization of Meetings," Odyssey 2012, The Speaker and Language Recognition Workshop, Jun. 25-28, 2012, Singapore, 8 pages.
Alam, Firoj, et al., "Annotating and Modeling Empathy in Spoken Conversations," Journal of Computer Speech and Language, 2018, 34 pages.

* cited by examiner

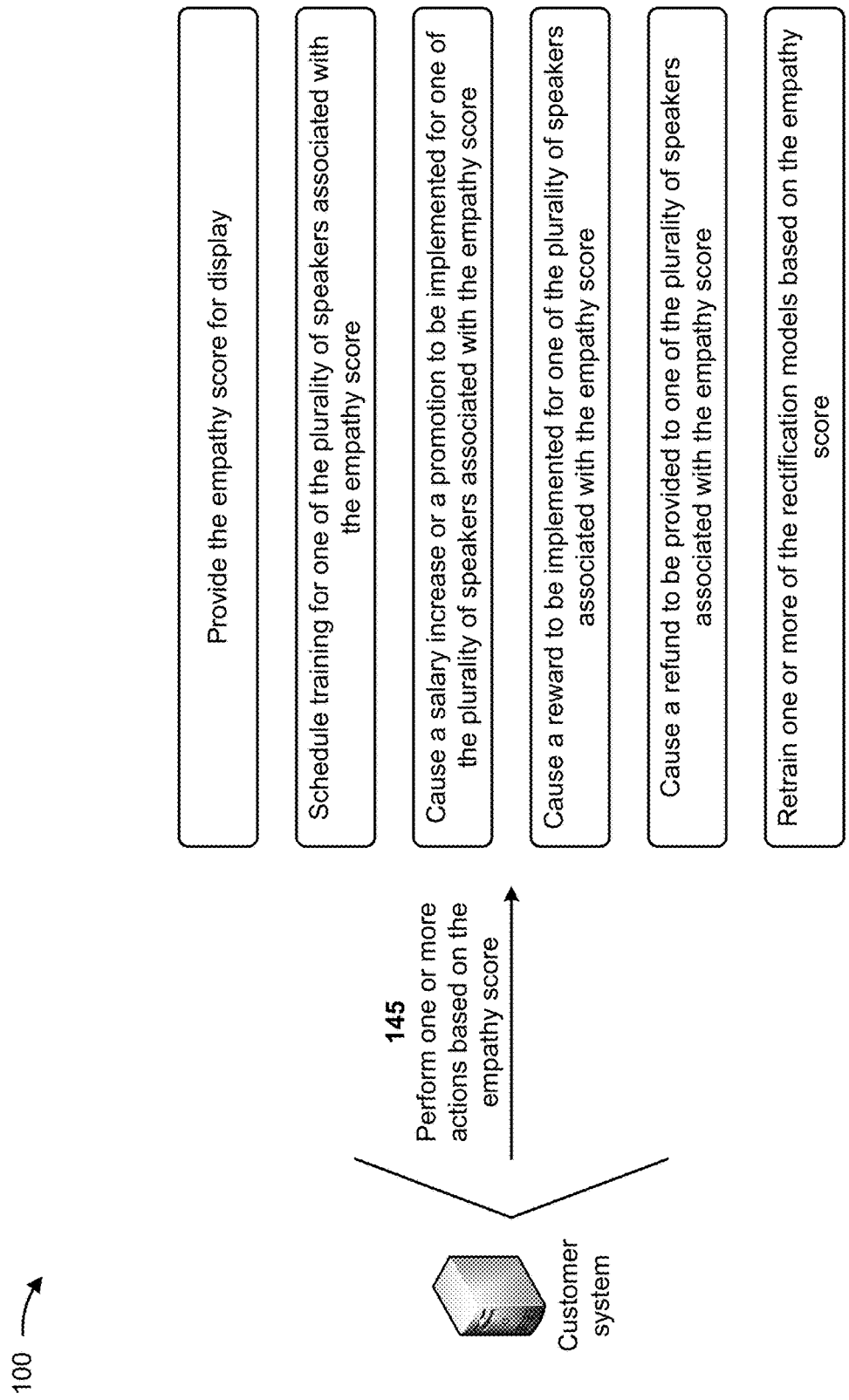

UTILIZING MACHINE LEARNING MODELS TO PROVIDE COGNITIVE SPEAKER FRACTIONALIZATION WITH EMPATHY RECOGNITION

BACKGROUND

Customer calls may be recorded as audio data. The audio data may be pre-processed and may be provided to a model for extracting audio features used for further analysis.

SUMMARY

In some implementations, a method may include receiving audio data identifying a conversation including a plurality of speakers and processing the audio data, with a plurality of clustering models, to identify a plurality of speaker segments. The method may include determining a plurality of diarization error rates for the plurality of speaker segments and identifying a plurality of errors in the plurality of speaker segments based on comparing each of the plurality of diarization error rates to one or more thresholds. The method may include selecting a rectification model to rectify each of the plurality of errors based on a cause of a corresponding one of the plurality of errors and based on features of a corresponding speaker segment, of the plurality of speaker segments, and segmenting and re-segmenting the audio data with the rectification models to generate re-segmented audio data. The method may include determining a plurality of modified diarization error rates for the plurality of speaker segments based on the re-segmented audio data and selecting a speaker segment, of the plurality of speaker segments, based on the plurality of modified diarization error rates. The method may include performing one or more actions based on the speaker segment.

In some implementations, a device may include one or more memories and one or more processors to receive audio data identifying a conversation including a plurality of speakers and process the audio data, with a plurality of clustering models, to identify a plurality of speaker segments, wherein the plurality of clustering models includes a k-means clustering model, a spectral clustering model, an agglomerative clustering model and an Ensemble model. The one or more processors may determine a plurality of diarization error rates for the plurality of speaker segments and may identify a plurality of errors in the plurality of speaker segments based on comparing each of the plurality of diarization error rates to a threshold. The one or more processors may select a rectification model to rectify each of the plurality of errors based on a cause of a corresponding one of the plurality of errors and based on features of a corresponding one of the plurality of speaker segments, and may segment and re-segment the audio data with the rectification models to generate re-segmented audio data. The one or more processors may determine a plurality of modified diarization error rates for the plurality of speaker segments based on the re-segmented audio data and may select one of the plurality of speaker segments based on the plurality of modified diarization error rates. The one or more processors may calculate an empathy score based on the one of the plurality of speaker segments and may perform one or more actions based on the empathy score.

In some implementations, a non-transitory computer-readable medium may store a set of instructions that includes one or more instructions that, when executed by one or more processors of a device, cause the device to receive audio data identifying a conversation including a plurality of speakers and process the audio data, with a plurality of clustering models, to identify a plurality of speaker segments. The one or more instructions may cause the device to determine a plurality of diarization error rates for the plurality of speaker segments and identify a plurality of errors in the plurality of speaker segments based on comparing each of the plurality of diarization error rates to a threshold. The one or more instructions may cause the device to select a rectification model to rectify each of the plurality of errors based on a cause of a corresponding one of the plurality of errors and based on features of a corresponding one of the plurality of speaker segments, and segment and re-segment the audio data with the rectification models to generate re-segmented audio data. The one or more instructions may cause the device to determine a plurality of modified diarization error rates for the plurality of speaker segments based on the re-segmented audio data and select one of the plurality of speaker segments based on the plurality of modified diarization error rates. The one or more instructions may cause the device to calculate an emotion score based on the segmented and re-segmented audio data until threshold is achieved and based on the one of the plurality of speaker segments and convert the re-segmented audio data, for the one of the plurality of speaker segments, to text data. The one or more instructions may cause the device to calculate an intent score based on the text data and calculate a sentiment score based on the text data. The one or more instructions may cause the device to calculate an empathy score based on the emotion score, the intent score, and the sentiment score and perform one or more actions based on the empathy score.

BRIEF DESCRIPTION OF THE DRAWINGS

FIGS. 1A-1F are diagrams of an example implementation described herein.

DETAILED DESCRIPTION

Figure 1A:
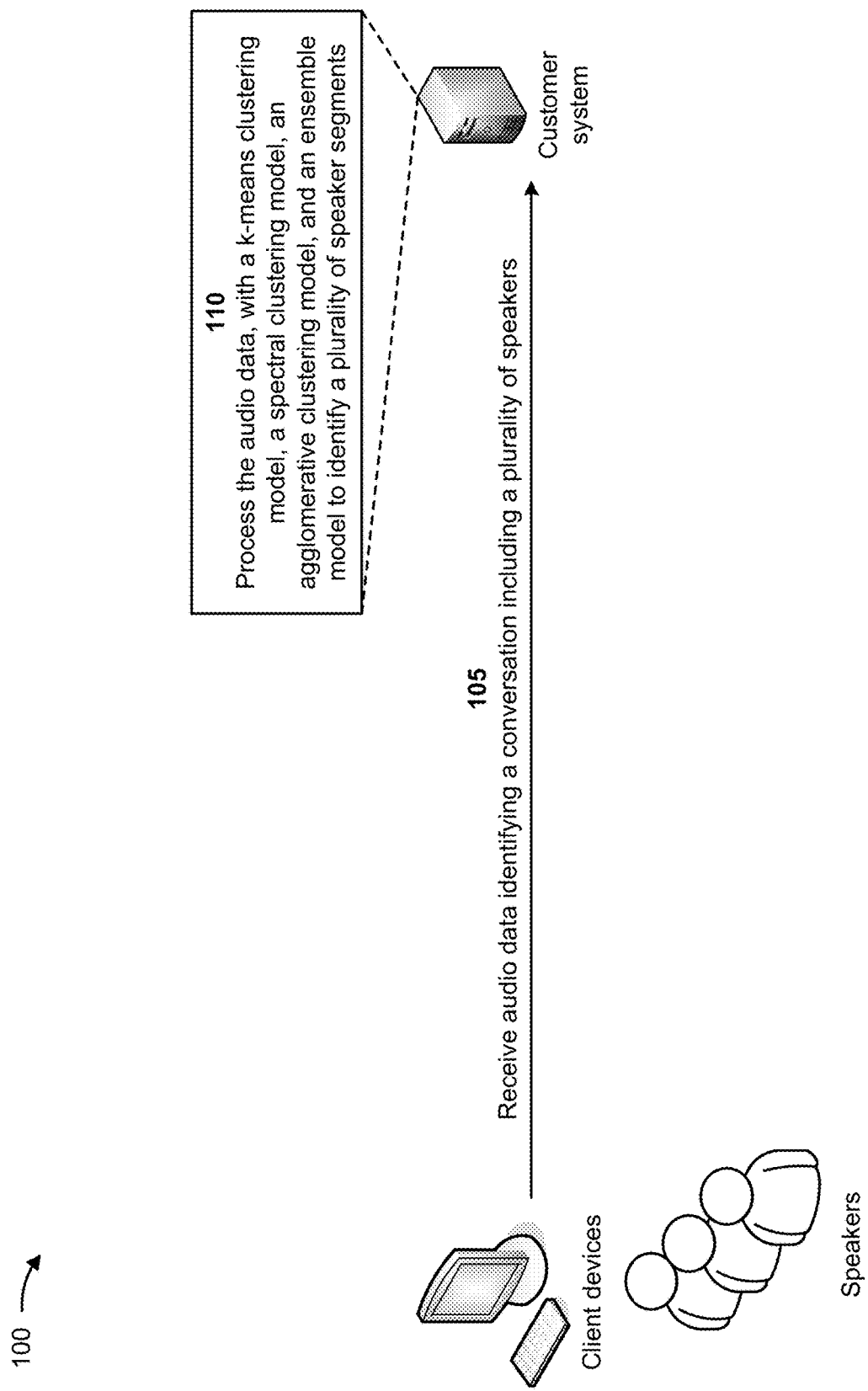

The following detailed description of example implementations refers to the accompanying drawings. The same reference numbers in different drawings may identify the same or similar elements.

Speakers in a customer call may be identified from the audio data through speaker diarization. Speaker diarization may be performed to partition audio data into homogeneous audio segments according to identities of the speakers. A feature extraction process may be utilized to extract, from the audio data, meaningful features that will be used to create the audio segments. Emotion and sentiment of a target speaker may be determined from a textual version of the audio data, and an empathy score may be determined based on a text analysis of the textual version of the audio data. However, there are no current empathy detection techniques that automatically derive the empathy score based on analyzing the complete audio data. Thus current techniques for determining an empathy score may determine an inaccurate empathy score and, therefore, waste computing resources (e.g., processing resources, memory resources, communication resources, and/or the like), networking resources, and/or the like associated with calculating inaccurate empathy scores, performing incorrect actions based on the inaccurate empathy scores, handling customer complaints associated with the inaccurate empathy scores, and/or the like. Further, current empathy detection techniques may extract and/or process hundreds of features from the audio data thereby consuming large amounts of computing resources.

Some implementations described herein relate to a customer system that utilizes machine learning models to provide cognitive speaker fractionalization with empathy recognition. For example, the customer system may receive audio data identifying a conversation including a plurality of speakers. The customer system may process the audio data, with a plurality of clustering models, to identify a plurality of speaker segments associated with the plurality of speakers. The customer system may determine a plurality of diarization error rates for the plurality of speaker segments and may identify a plurality of errors in the plurality of speaker segments based on comparing each of the plurality of diarization error rates to a threshold. The customer system may select a rectification model to rectify each of the plurality of errors based on a cause of a corresponding one of the plurality of errors and based on features of a corresponding one of the plurality of speaker segments. The customer system may re-segment the audio data with the rectification models to generate re-segmented audio data. The customer system may determine a plurality of modified diarization error rates for the plurality of speaker segments based on the re-segmented audio data and may select one of the plurality of speaker segments based on the plurality of modified diarization error rates. The customer system may calculate an empathy score based on the analysis of the plurality of speaker segments both audio and textually and may perform one or more actions based on the empathy score.

In this way, the customer system utilizes machine learning models to provide cognitive speaker fractionalization with empathy recognition. The customer system may pre-process audio data and may apply a customized feature reduction technique (e.g., which reduces computation time) to create selective audio features. The customer system may utilize the audio features for analysis and clustering. The customer system may process the audio features, with a diarization model, to separate the audio segments from the audio data based on speaker changes in the audio data and based on identifying start and end times of a speaker in the audio data. The customer system may utilize outputs of the diarization model to identify an empathy score for a speaker based on the audio segments of the speaker and based on audio and textual analysis. This, in turn, conserves computing resources, networking resources, human resources, and/or the like that would otherwise have been wasted in calculating incorrect empathy scores, performing incorrect actions based on the incorrect empathy scores, handling customer complaints associated with the incorrect empathy scores, and/or the like.

FIGS. 1A-1F are diagrams of an example 100 associated with utilizing machine learning models to provide cognitive speaker fractionalization with empathy recognition. As shown in FIGS. 1A-1F, example 100 includes client devices associated with speakers, and a customer system. The client devices and the customer system are described in greater detail below with respect to FIG. 3.

As shown in FIG. 1A, and by reference number 105, the customer system receives audio data identifying a conversation including a plurality of speakers. The audio data may correspond to a recording of a conversation including a plurality of speakers. For example, the audio data may correspond to a recording of a conversation between a customer and a customer service representative, a recording of a conversation occurring during a business meeting, a recording of an online student assessment, a recording of a voice mail message, a recording of a virtual interview, a recording of a doctor/patient consultation, and/or the like.

The recorded conversation may be stored in a particular format (e.g., a .wav format, an mp3 format, and/or the like) on a server device associated with the customer system. The customer system may receive the audio data from the server device periodically, based on providing a request to the server device, and/or based on an occurrence of an event (e.g., the server device receiving the audio data from a client device that recorded the conversation), among other examples.

As shown by reference number 110, the customer system processes the audio data, with a k-means clustering model, a spectral clustering model, an agglomerative clustering model, and an ensemble model, to identify a plurality of speaker segments. In some implementations, the customer system identifies the plurality of speaker segments based on features extracted from the audio data. The customer system may utilize one or more machine learning models to process the audio data to extract features from the audio data. In some implementations, the one or more machine learning models include one or more classification models. The one or more classification models may be created based on a k-nearest neighbors (KNN) algorithm and/or a support vector machine (SVM) algorithm.

In some implementations, the extracted features may include Mel-frequency cepstral coefficients (MFCC) features. For example, the customer system may process the audio data with one or more machine learning models to extract Mel-frequency cepstral (MFC) coefficients and/or first order derivatives of the MFC coefficients (deltas) from the audio data.

The MFC coefficients may describe the overall shape of a spectral envelope associated with the audio data. In some implementations, the one or more machine learning models may divide the audio data into a plurality of frames and may generate the MFC coefficients by using MFCC filter banks for each frame. The MFC coefficients may be a set of coefficients included in an MFC corresponding to a representation of a short-term power spectrum associated with the audio data that is generated based on a linear cosine transform of a log power spectrum on a nonlinear Mel scale of frequency. The deltas may measure the changes in the MFC coefficients from a previous frame to a next frame.

In some implementations, the customer system extracts twenty-six MFCC features. For example, the customer system may extract thirteen MFC coefficients and 13 deltas. By utilizing the one or more machine learning models to extract a limited set of features (e.g., rather than all of the features of the audio data such as chroma vectors, entropy, and/or the like), an amount of time required to train the one or more machine learning models may be reduced (e.g., about a fifty percent reduction) relative to an amount of time required to train the one or more machine learning models to extract all of the features of the audio data. By reducing the amount of time required to train the one or more machine learning models, the customer system may reduce an amount of computing resources utilized to train the one or more machine learning models relative to an amount of computing resources utilized to train the one or more machine learning models to extract all of the features of the audio data.

In some implementations, the customer system utilizes a first machine learning model to process the audio data. In some implementations, the customer system pre-processes the audio data. The pre-processing performed on the audio data may output a Numpy array of audio features (e.g., fifty-two MFCC features) extracted from the audio data. The customer system may provide the Numpy array to a machine learning model. The machine learning model may process the Numpy array to limit and extract 26 MFCC features (e.g., 13 MFC coefficients and 13 deltas) and may output a Numpy array of a reduced quantity of audio features associated with the audio data.

The customer system may generate a list of class labels based on the extracted features. In some implementations, the customer system processes the extracted features with a plurality of clustering models. The plurality of clustering models may include a k-means clustering model, a spectral clustering model, an agglomerative clustering model, and an ensemble clustering model. The ensemble clustering model may utilize a k-means clustering algorithm, a spectral clustering algorithm, and an agglomerative clustering algorithm to generate a list of class labels based on the extracted features.

Each clustering model may receive the extracted features and a quantity of speakers included in the plurality of speakers as an input, and may utilize one or more clustering algorithms (e.g., a k-means clustering algorithm, a spectral clustering algorithm, and/or an agglomerative clustering algorithm) to process the extracted features to generate an output. The output of a clustering model may include a list of class labels, a plurality of confidence scores indicating a likelihood that the class labels accurately identify a speaker, of the plurality of speakers, associated with a segment of audio data, and a plurality of diarization error rates. The list of class labels may correspond to the plurality of speakers. For example, a first class label, of the list of class labels, may be associated with a first speaker of the plurality of speakers, a second class label may be associated with a second speaker, and/or the like. A diarization error rate, of the plurality of diarization rates, may indicate a fraction of time that is not attributed correctly to a speaker or to non-speech for one of the plurality of clustering models.

The customer system may generate a final list of class labels based on an output of the plurality of clustering models. For example, the customer system may utilize a majority soft voting process to generate the final list of class labels based on the outputs of the plurality of clustering models. The majority soft voting process may generate the final list of class labels based on the confidence scores output by the plurality of clustering models and/or an average of the confidence scores output by the plurality of clustering models.

The customer system may generate timestamp segments based on the list of class labels. A timestamp segment may be associated with a portion of the audio data corresponding to a portion of the conversation spoken by a particular speaker of the plurality of speakers. The customer system may identify the plurality of speaker segments based on the timestamp segments and the associated portions of the audio data. In some implementations, the plurality of speaker segments includes diarized audio segments.

Figure 1B:
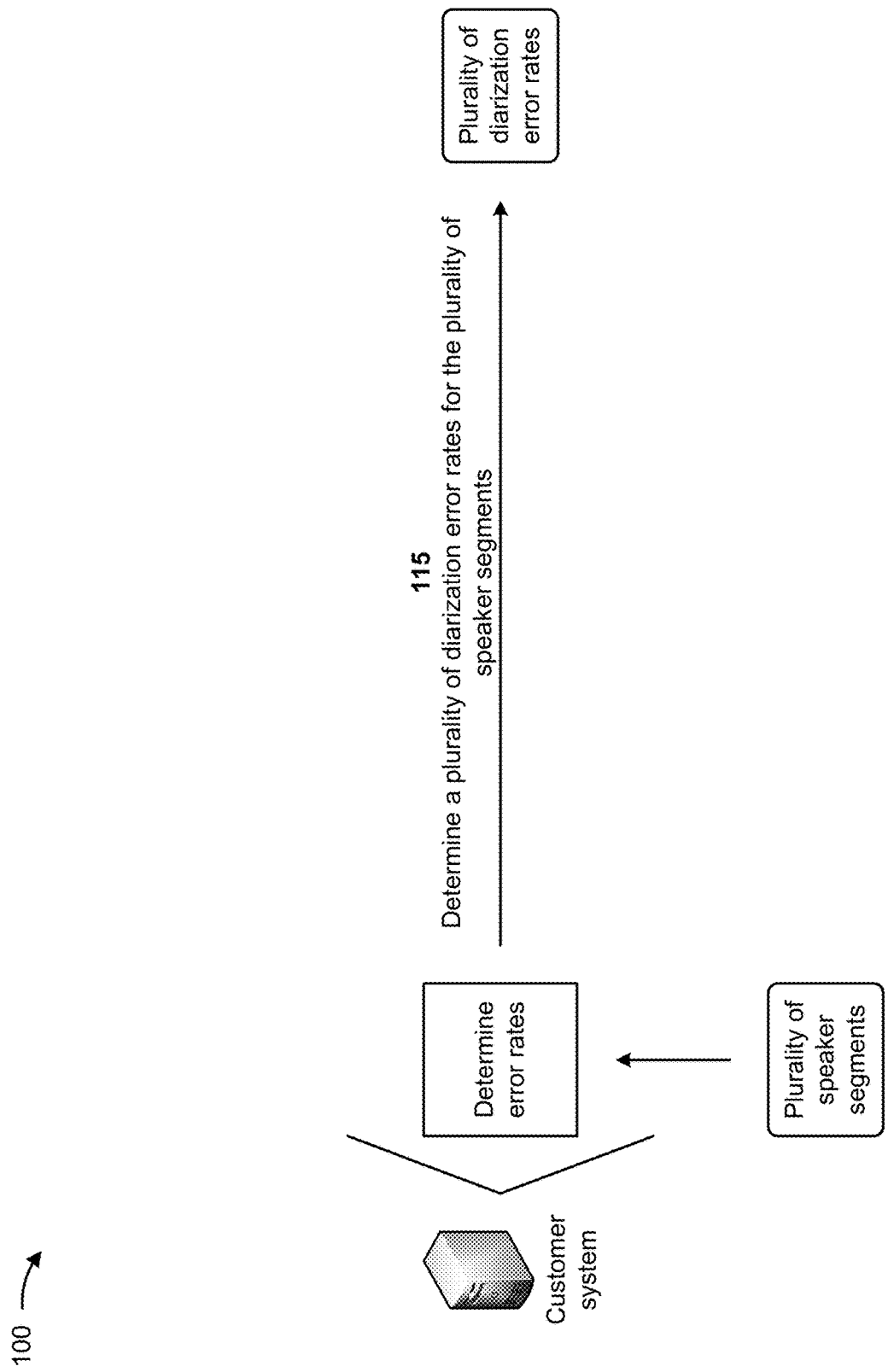

As shown in FIG. 1B, and by reference number 115, the customer system determines a plurality of diarization error rates for the plurality of speaker segments. The customer system may determine the plurality of diarization error rates based on the outputs of the plurality of clustering models. The customer system may store the plurality of diarization error rates in a data structure (e.g., a database, a table, a list, and/or the like).

The customer system may compare each of the plurality of diarization error rates to a threshold. The threshold may comprise a reference diarization error rate that may be derived from a diarization knowledge base that is prepared based on historical data. As an example, the customer system may compare the diarization error rate for a clustering model (e.g., the k-means clustering model, the spectral clustering model, the agglomerative clustering model, or the ensemble clustering model) to a threshold (e.g., a reference diarization error rate). If the diarization error rate is less than the threshold, it leads to a reward and the customer system selects a speaker segment, of the plurality of speaker segments, as described below with respect to FIG. 1E. If the diarization error rate is not less than the threshold, it leads to a penalty and the customer system identifies one or more factors contributing to the diarization error rate. For example, the customer system may identify a plurality of errors in the speaker segments, as described below with respect to FIG. 1C. The customer system may compare the diarization error rate for each clustering model and may determine whether each diarization error rate is less than the threshold, in a manner similar to that described above.

Figure 1C:
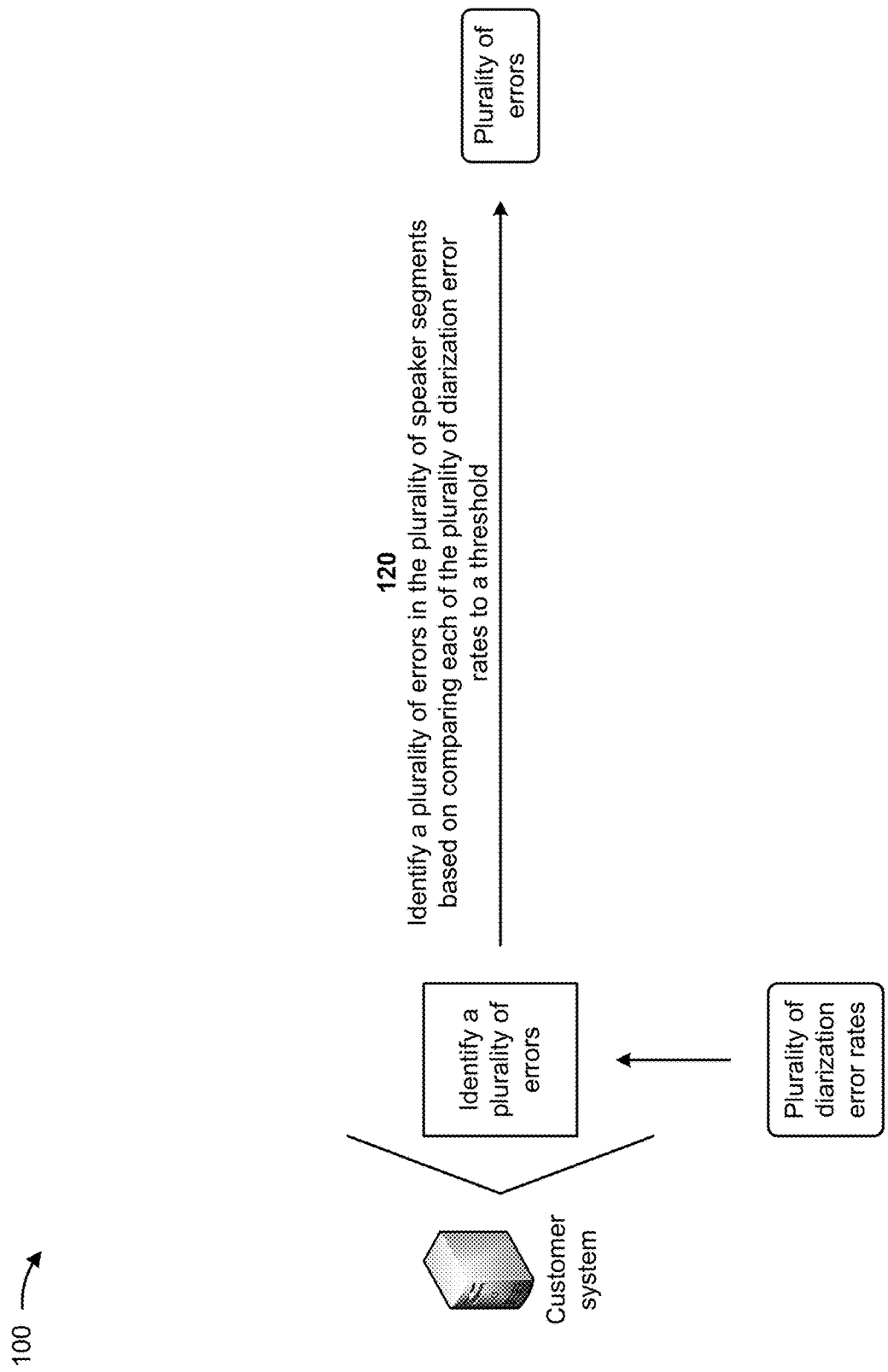

In some implementations, if the customer system determines that one or more of the plurality of diarization rates do not satisfy the threshold, as shown in FIG. 1C, and by reference number 120, the customer system identifies a plurality of errors in the plurality of speaker segments based on comparing each of the plurality of diarization error rates to a threshold and based on determining that one or more of the plurality of diarization rates do not satisfy the threshold. The plurality of errors may include an improper identification of a speaker error, a false alarm speech error (e.g., a non-speech segment (e.g., a portion of audio data not including speech) incorrectly labeled as a speaker segment), a missed speech error (e.g., a speaker segment incorrectly labeled as a non-speech segment), an overlapping speaker error (e.g., a percentage of time that a speaker, of multiple speakers of a speaker segment, does not get labeled), and/or the like. The customer system may identify an error based on determining that a diarization error rate for a clustering model does not satisfy the threshold.

Figure 1D:
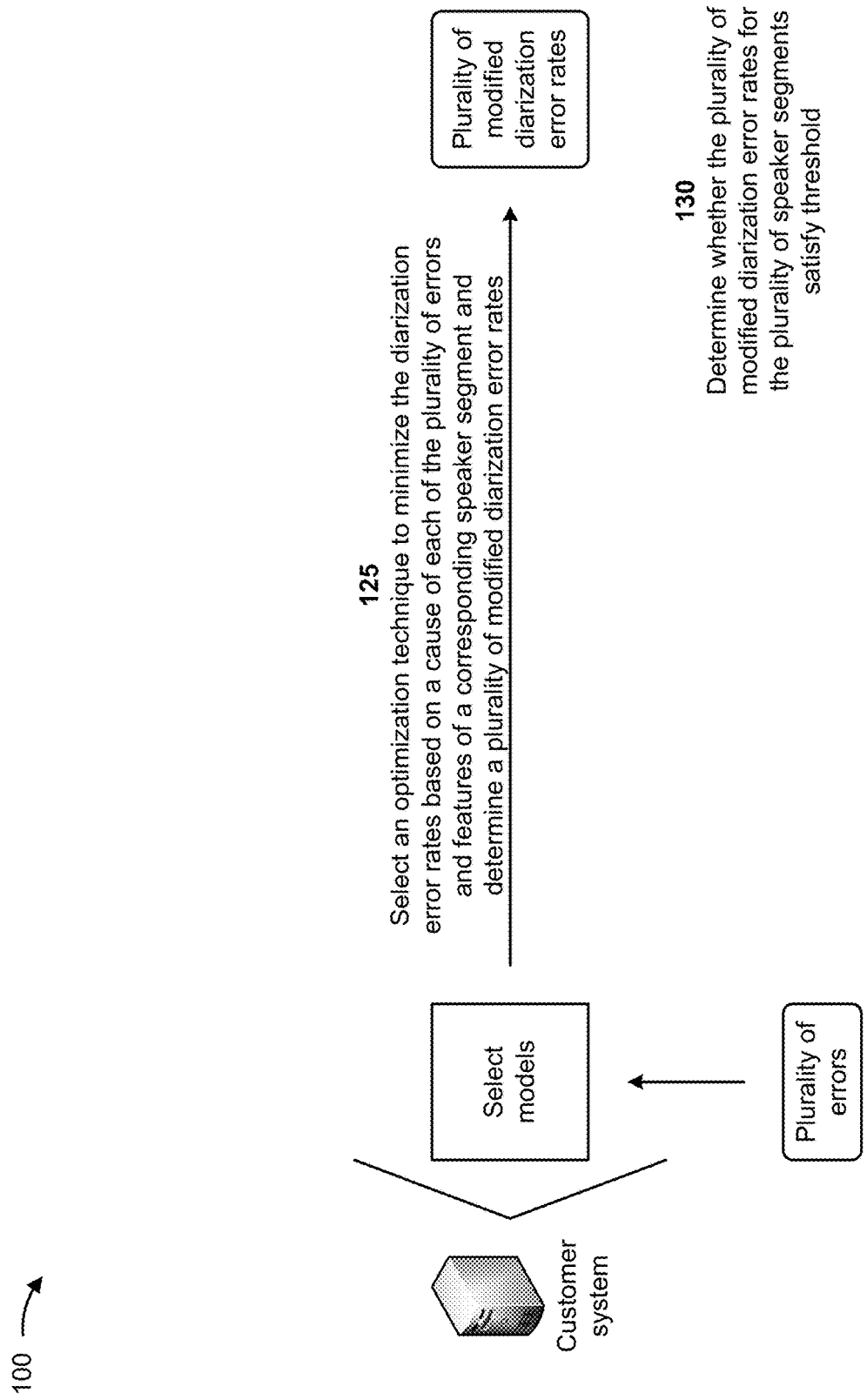

As shown in FIG. 1D, and by reference number 125, the customer system selects an optimization technique to minimize the diarization error rates based on a cause of each of the plurality of errors and features of a corresponding speaker segment, and determines a plurality of modified diarization error rates. In some implementations, the optimization technique may be applied by an optimum rectification model. The optimum rectification model may include a hidden Markov model, a median filtering model, a cluster time-interpolated reconstruction model, and/or a false alarm reduction model. The customer system may process the audio data with the hidden Markov model, the median filtering model, the cluster time-interpolated reconstruction model, and/or the false alarm reduction model to rectify the plurality of errors.

During the initial training stages the customer system may utilize various optimization techniques, such as median filtering, false alarm reduction using contextual information, linear interpolation reconstruction, HMI segmentation, and/or the like. Over a period of time, the optimum rectification model self-learns from past execution results to identify a best optimization technique for each type of error. Additionally, the customer system may identify for which use case, scenario, and/or the like an optimization technique is to be applied based on one or more characteristics of the audio data, such as an audio source type, frequency, noise, pitch, silence within an audio segment (e.g., in seconds), audio segment energy, overlapping audio segments, and/or the like. The customer system may identify the best model, algorithm, the best fit optimization, and the maximum possible threshold continuously using the self-learning capability.

In some implementations, the customer system determines a type of error (e.g., an improper identification of a speaker error, a false alarm speech error, a missed speech error, an overlapping speaker error, and/or the like) that has a greatest contribution to the diarization error rate relative to other types of errors. The customer system may select the optimum rectification model based on the type of error having the greatest contribution to the diarization error rate.

In some implementations, information associated with the optimization techniques are stored in a data structure (e.g., a knowledge base). The customer system may update the information associated with the optimization techniques based on results of applying the optimization techniques to various types of errors.

The information associated with the optimization techniques may indicate a best optimization technique associated with the type of error. For example, median filtering may be associated with speaker errors, HMI segmentation may be associated with overlap errors, linear interpolation reconstruction may be associated with missed speech errors, false alarm reduction using contextual information may be associated with false alarm errors, and/or the like.

Median filtering may utilize class labels predicted by a model as an input and may include a non-linear filtering technique for reducing noise in the audio data when there is a change in speakers. Median filtering may generate a set of class labels as an output.

False alarm reduction using contextual information may utilize text converted from the audio data as an input and may determine a Levenshtein distance between a reference segment and a word segment of the text. If the Levenshtein distance, normalized by the length of the investigated word, is smaller than a predefined threshold value, the word is not rejected. False alarm reduction using contextual information may generate an output that includes a reduced quantity of false alarm errors.

Linear interpolation reconstruction may utilize an incomplete spectrogram of the audio data as an input. Linear interpolation reconstruction may utilize a linear interpolation formula to reconstruct missing elements in the spectrogram.

HMM segmentation may utilize class labels predicted by a model as an input and may utilize a Gaussian HMM function in a HMMlearn package to perform HMM segmentation. HMM segmentation may generate a set of class labels as an output based on performing the HMM segmentation.

The customer system may determine a plurality of modified diarization error rates for the plurality of speaker segments based on applying the optimization techniques. In some implementations, the customer system performs a quantity of iterations (e.g., two, three, four, and/or the like) of applying the optimization techniques and determines the plurality of modified diarization error rates based on performing the quantity of iterations. In some implementations, the customer system processes the re-segmented audio data with the plurality of clustering models and determines the plurality of modified diarization error rates based on outputs of the plurality of clustering models, in a manner similar to that described above.

As shown by reference number 130, the customer system determines whether the plurality of modified diarization error rates for the plurality of speaker segments satisfy a threshold. In some implementations, the customer system determines whether the plurality of modified diarization error rates satisfy the threshold in a manner similar to that described above.

As an example, a diarization error rate for a clustering model may be 17%. The customer system may determine that speaker error in the diarization error rate is 60% and missed speech error in the diarization error rate is 40%. In a first iteration, the customer system may apply a first optimization technique for speaker error and a second optimization technique for speech error. Applying the first and second optimization techniques may reduce diarization error rate to 16%, may reduce speaker error to 40%, and may reduce speech error to 25%.

The customer system may determine that the modified diarization error rate (e.g., 16%) is greater than the threshold. The customer planning system may perform a second iteration based on the modified diarization error rate being greater than the threshold. In the second iteration, the customer system may apply a third optimization technique for speaker error and a fourth optimization technique for speech error. The third optimization technique may be the same as, or different from, the first optimization technique and the fourth optimization technique may be the same as, or different from, the second optimization technique. Applying the third and fourth optimization techniques may reduce diarization error rate to 15%, may reduce speaker error to 21%, and may reduce speech error to 12%.

The customer system may determine that the modified diarization error rate (e.g., 15%) is greater than the threshold. The customer planning system may perform a third iteration based on the modified diarization error rate being greater than the threshold. In the third iteration, the customer system may apply a fifth optimization technique for speaker error and a sixth optimization technique for speech error. The fifth optimization technique may be the same as, or different from, the first optimization technique and/or the third optimization technique. The sixth optimization technique may be the same as, or different from, the second optimization technique and/or the fourth optimization technique. Applying the third and fourth optimization techniques may reduce diarization error rate to 14%, may reduce speaker error to 7%, and may reduce speech error to 5%.

In some implementations, the customer system may determine that the modified diarization error rate does not satisfy the threshold. For example, the customer system may determine that the modified diarization error rate is greater than a reference diarization error rate. In these implementations, the customer system may re-train the clustering model based on the modified diarization error rate not satisfying the threshold. The customer system may re-segment the audio data to identify another plurality of speaker segments and may utilize the re-trained clustering model to determine a diarization error rate, in a manner similar to that described above. The customer system may determine a modified diarization error rate for each of the plurality of diarization error rates in a similar manner.

Figure 1E:
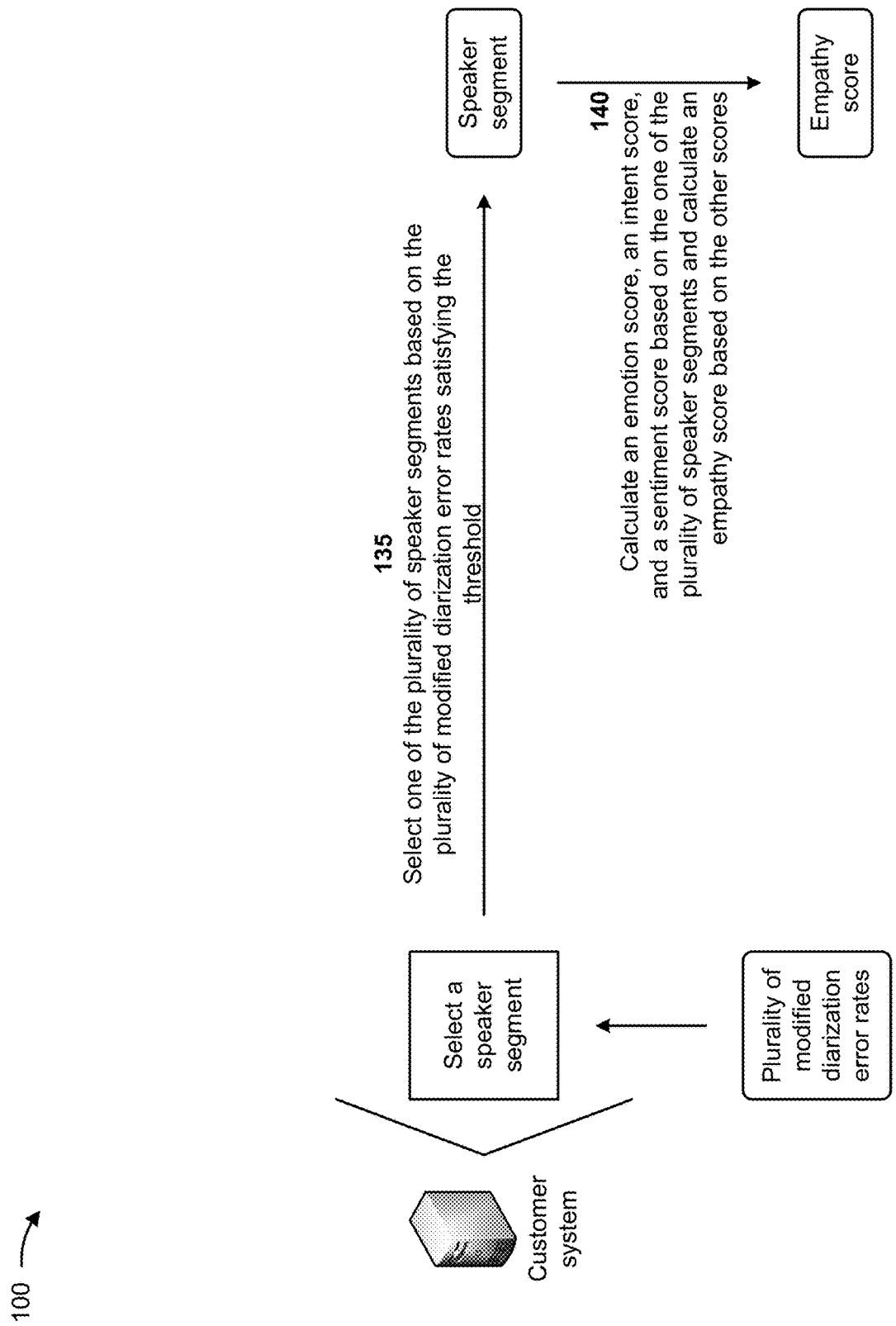

In some implementations, the customer system determines that the plurality of modified diarization error rates satisfy the threshold. As shown in FIG. 1E, and by reference number 135, the customer system selects one of the plurality of speaker segments based on the plurality of modified diarization error rates satisfying the threshold.

As shown by reference number 140, the customer system calculates an emotion score, an intent score, and a sentiment score based on the one of the plurality of speaker segments and calculates an empathy score based on the other scores (e.g., the emotion score, the intent score, and the sentiment score). In some implementations, the customer system calculates an emotion score, for the one of the plurality of speaker segments, based on the re-segmented audio data. For example, the customer system may process the one of the plurality of speaker segments with a convolutional neural network (CNN) model to calculate the emotion score.

The customer system may convert the segmented audio data to text data. The customer system may calculate an intent score, for the one of the plurality of speaker segments, based on the text data. For example, the customer system may process the one of the plurality of speaker segments, with a natural language processing (NLP) model and/or a cosine similarity model, to calculate the intent score.

The customer system may calculate a sentiment score, for the one of the plurality of speaker segments, based on the text data. For example, the customer system may process the one of the plurality of speaker segments, with an NLP library, to calculate the sentiment score.

The customer system may calculate the empathy score based on the emotion score, the intent score, and the sentiment score. The empathy score may provide an indication of whether one of the plurality of speakers, associated with the empathy score, is empathetic, neutral, or non-empathetic. The customer system may determine an empathy score for each speaker segment, of the plurality of speaker segments, in a manner similar to that described above.

As shown in FIG. 1F, and by reference number 135, the customer system may perform one or more actions based on the empathy score. In some implementations, the one or more actions include the customer system providing the empathy score for display, scheduling training for one of the plurality of speakers associated with the empathy score, causing a salary increase and/or a promotion to be implemented for one of the plurality of speakers associated with the empathy score, causing a reward to be implemented for one of the plurality of speakers associated with the empathy score, causing a refund to be provided to one of the plurality of speakers associated with the empathy score.

Alternatively, and/or additionally, one or more actions include the customer system retraining one or more of the rectification models based on the empathy score. The customer system may utilize the empathy score as additional training data for retraining the one or more of the rectification models, thereby increasing the quantity of training data available for training the one or more of the rectification models. Accordingly, the customer system may conserve computing resources associated with identifying, obtaining, and/or generating historical data for training the one or more of the rectification models relative to other systems for identifying, obtaining, and/or generating historical data for training machine learning models.

In this way, the customer system utilizes machine learning models to provide cognitive speaker fractionalization with empathy recognition. The customer system may pre-process audio data and may apply a customized feature reduction technique (e.g., which reduces computation time) to create selective audio features. The customer system may utilize the audio features for the analysis and clustering. The customer system may process the audio features, with a diarization model, to separate the audio segments from the audio data based on speaker changes in the audio data and based on identifying start and end times of a speaker in the audio data. The customer system may utilize outputs of the diarization model to identify an empathy score for a speaker based on the audio segments of the speaker and based on audio analysis. This, in turn, conserves computing resources, networking resources, human resources, and/or the like that would otherwise have been wasted in calculating incorrect empathy scores, performing incorrect actions based on the incorrect empathy scores, handling customer complaints associated with the incorrect empathy scores, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
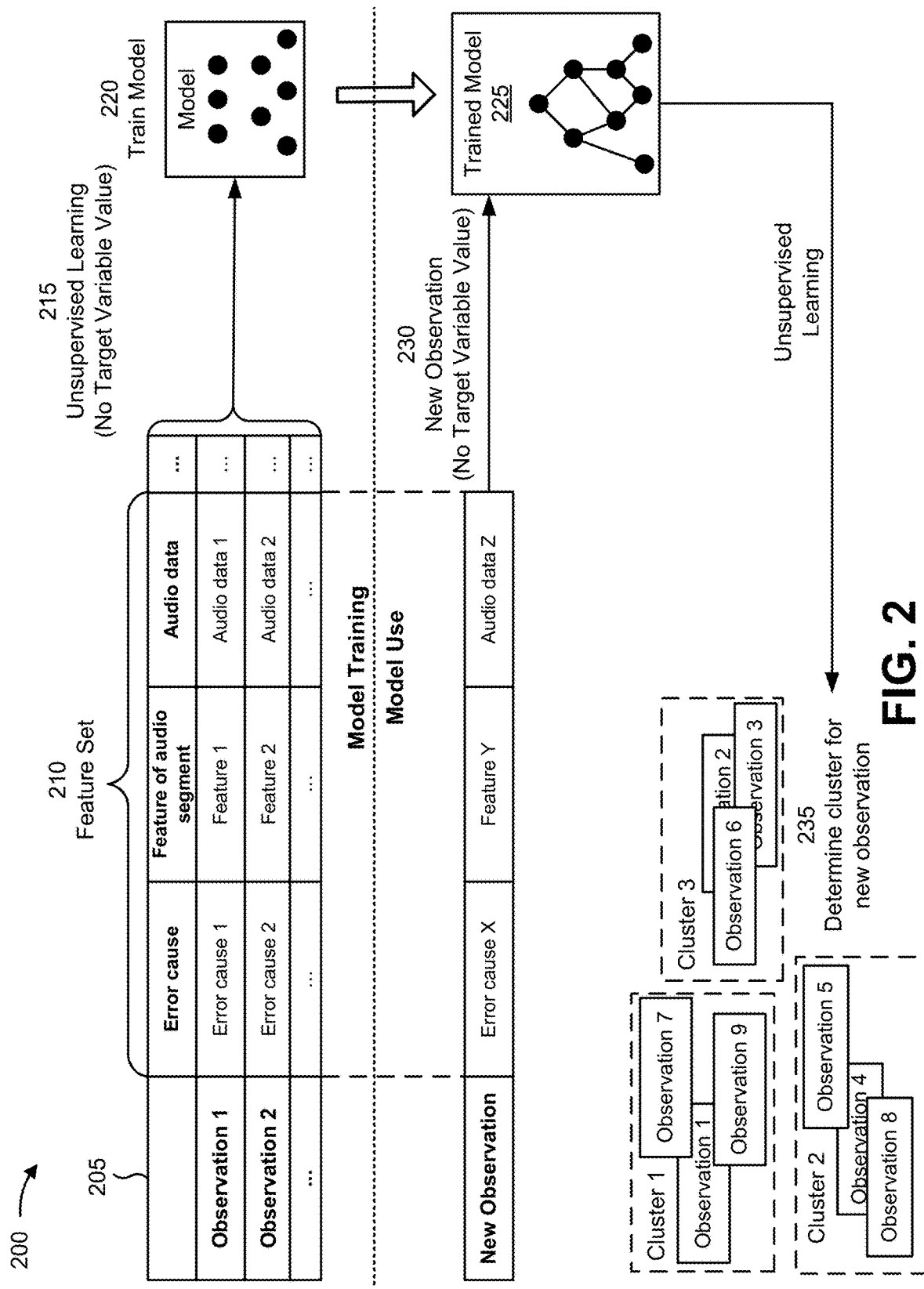
FIG. 2 is a diagram illustrating an example of training and using a machine learning model in connection with providing cognitive speaker fractionalization with empathy recognition.

FIG. 2 is a diagram illustrating an example 200 of training and using a machine learning model (e.g., the rectification models) in connection with providing cognitive speaker fractionalization with empathy recognition. The machine learning model training and usage described herein may be performed using a machine learning system. The machine learning system may include or may be included in a computing device, a server, a cloud computing environment, and/or the like, such as the customer system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the customer system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the customer system. For example, the machine learning system may identify a feature set (e.g., one or more features and/or feature values) by extracting the feature set from structured data, by performing natural language processing to extract the feature set from unstructured data, by receiving input from an operator, and/or the like.

In some implementations, as shown by reference number 215, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of error cause X, a second feature of feature Y, a third feature of audio data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of re-segmented audio data A for the target variable of the re-segmented audio data for the new observation. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 235. The observations within a cluster may have a threshold degree of similarity. As an example, if the machine learning system classifies the new observation in a first cluster (e.g., an error cause cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a feature of audio segment cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to provide cognitive speaker fractionalization with empathy recognition. The machine learning system enables recognition and/or identification of tens, hundreds, thousands, or millions of features and/or feature values for tens, hundreds, thousands, or millions of observations, thereby increasing accuracy and consistency and reducing delay associated with providing cognitive speaker fractionalization with empathy recognition relative to requiring computing resources to be allocated for tens, hundreds, or thousands of operators to manually provide cognitive speaker fractionalization with empathy recognition.

As indicated above, FIG. 2 is provided as an example. Other examples may differ from what is described in connection with FIG. 2.

Figure 3:
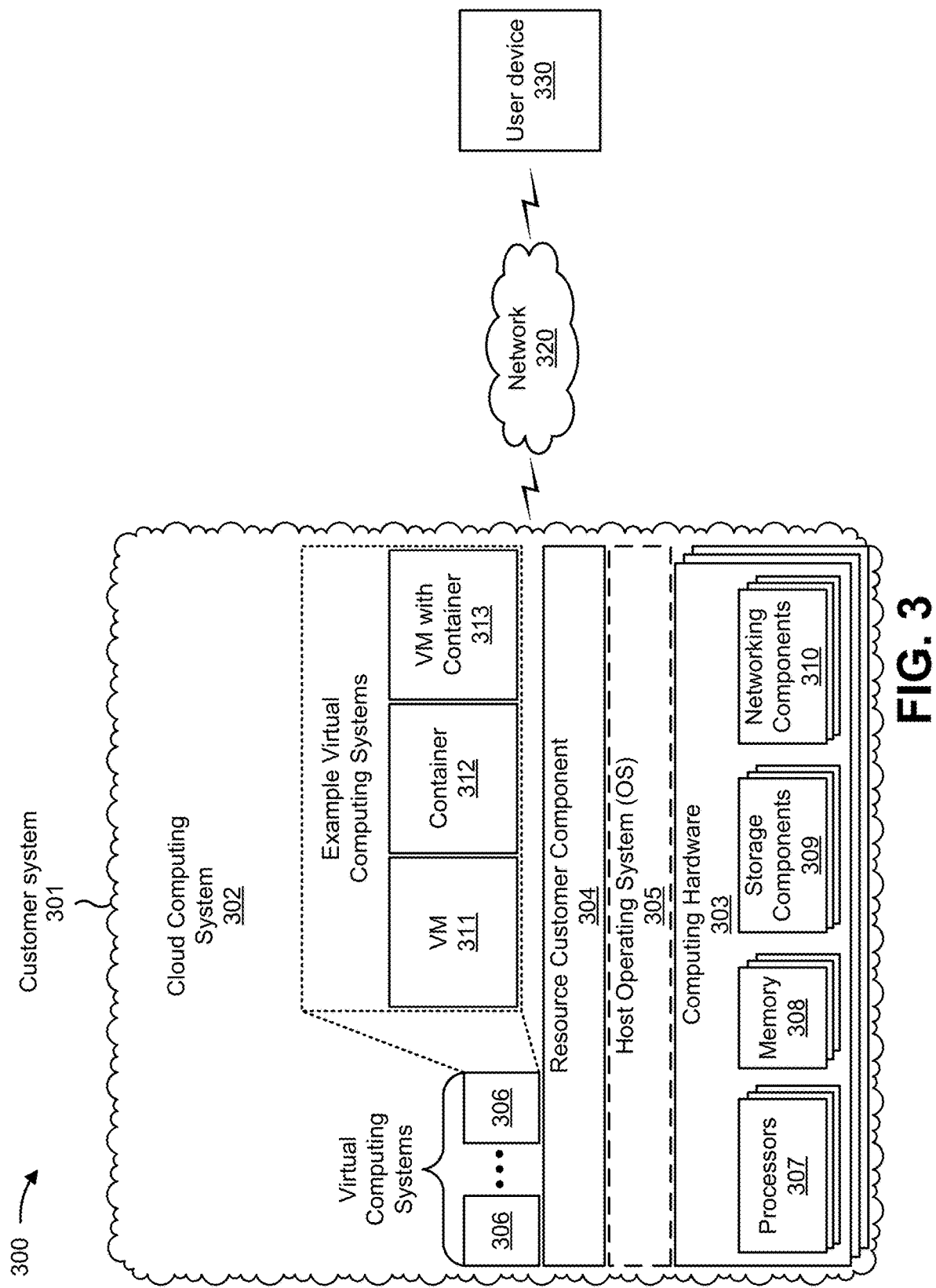
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a customer system 301, which may include one or more elements of and/or may execute within a cloud computing system 302. The cloud computing system 302 may include one or more elements 303-313, as described in more detail below. As further shown in FIG. 3, environment 300 may include a network 320 and/or a client device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the customer system 301 may include one or more elements 303-313 of the cloud computing system 302, may execute within the cloud computing system 302, and/or may be hosted within the cloud computing system 302, in some implementations, the customer system 301 may not be cloud-based (e.g., may be implemented outside of a cloud computing system) or may be partially cloud-based. For example, the customer system 301 may include one or more devices that are not part of the cloud computing system 302, such as device 400 of FIG. 4, which may include a stand-alone server or another type of computing device. The customer system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Client device 330 includes one or more devices capable of receiving, generating, storing, processing, and/or providing information, as described elsewhere herein. Client device 330 may include a communication device and/or a computing device. For example, client device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Client device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
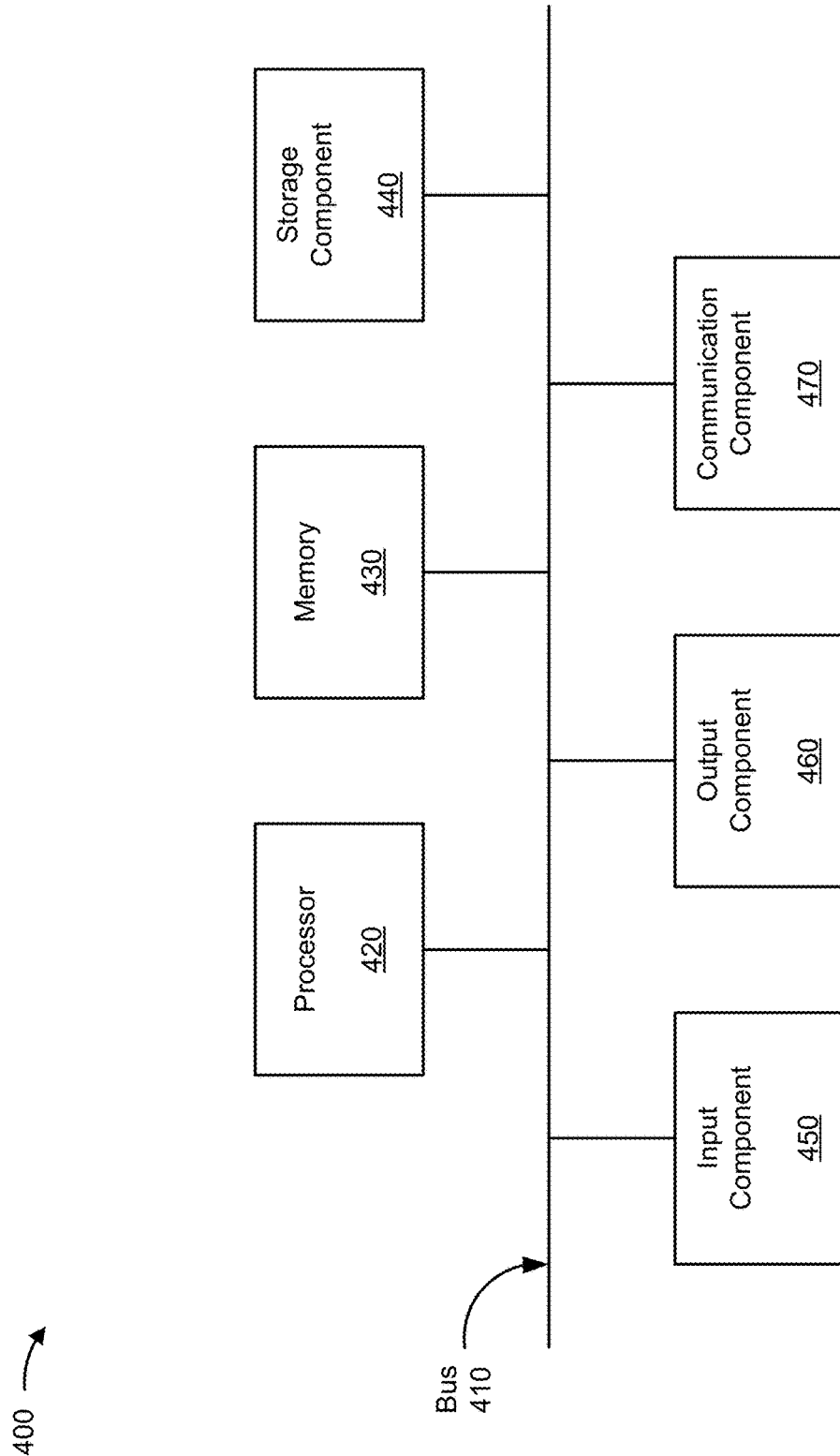
FIG. 4 is a diagram of example components of one or more devices of FIG. 3.

FIG. 4 is a diagram of example components of a device 400, which may correspond to customer system 301 and/or client device 330. In some implementations, customer system 301 and/or client device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
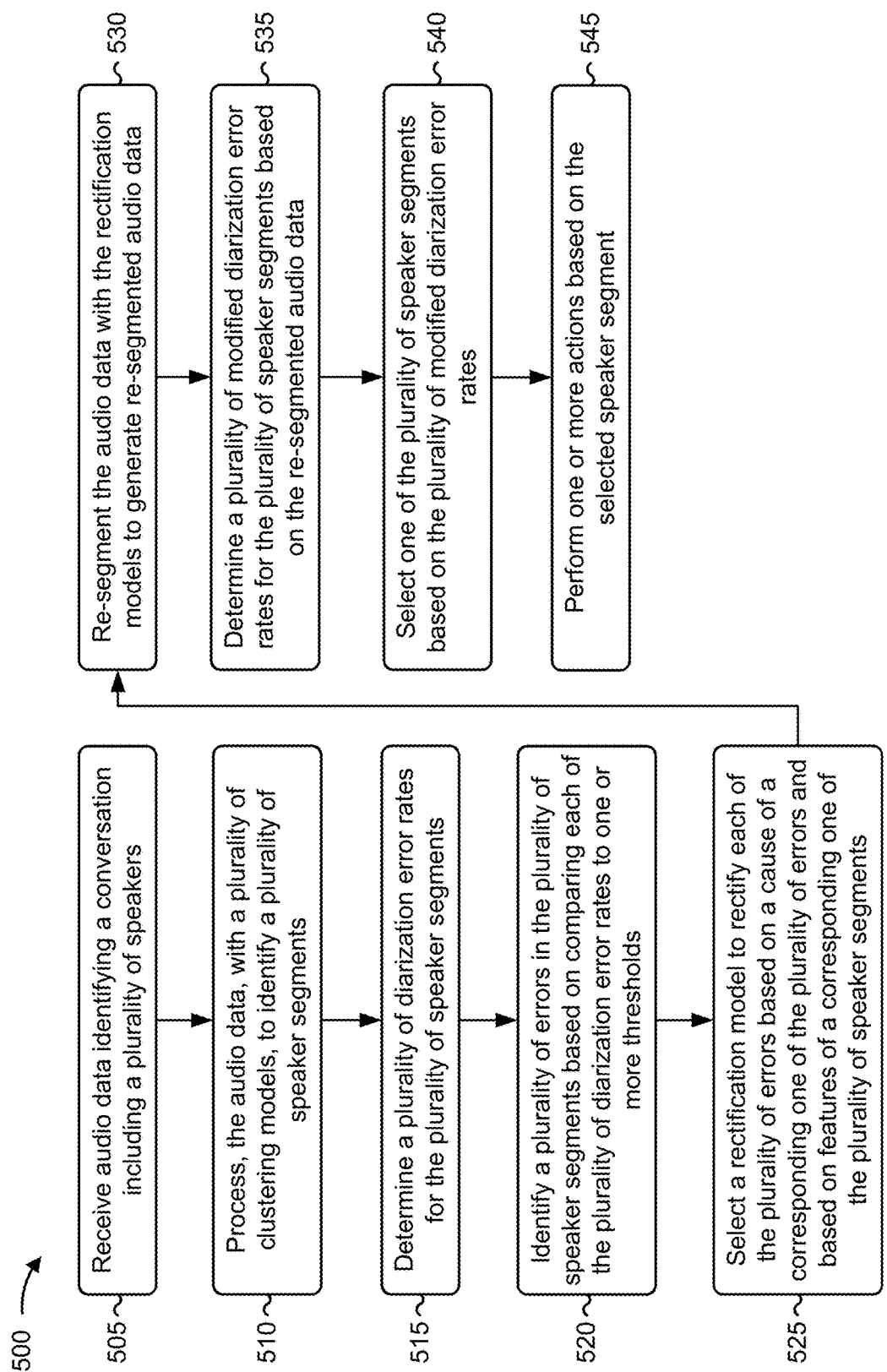
FIG. 5 is a flowchart of an example process for utilizing machine learning models to provide cognitive speaker fractionalization with empathy recognition.

FIG. 5 is a flowchart of an example process 500 for utilizing machine learning models to provide cognitive speaker fractionalization with empathy recognition. In some implementations, one or more process blocks of FIG. 5 may be performed by a device (e.g., customer system 301). In some implementations, one or more process blocks of FIG. 5 may be performed by another device or a group of devices separate from or including the device, such as a client device (e.g., client device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving audio data identifying a conversation including a plurality of speakers (block 505). For example, the device may receive audio data identifying a conversation including a plurality of speakers, as described above.

As further shown in FIG. 5, process 500 may include processing the audio data, with a plurality of clustering models, to identify a plurality of speaker segments (block 510). For example, the device may process the audio data, with a plurality of clustering models, to identify a plurality of speaker segments, as described above. The plurality of clustering models may include a k-means clustering model, a spectral clustering model, and/or an agglomerative clustering model.

The device may process the audio data, with one or more machine learning models, to extract features from the audio data. The features of the audio data may include MFC coefficients and first order MFC coefficients. In some implementations, the device may reduce a quantity of the features extracted from the audio data. The device may process the features, with the plurality of clustering models, to generate a list of class labels. The device may generate timestamp segments based on the list of class labels. The device may identify the plurality of speaker segments based on the timestamp segments.

As further shown in FIG. 5, process 500 may include determining a plurality of diarization error rates for the plurality of speaker segments (block 515). For example, the device may determine a plurality of diarization error rates for the plurality of speaker segments, as described above.

As further shown in FIG. 5, process 500 may include identifying a plurality of errors in the plurality of speaker segments based on comparing each of the plurality of diarization error rates to one or more thresholds (block 520). For example, the device may identify a plurality of errors in the plurality of speaker segments based on comparing each of the plurality of diarization error rates to one or more thresholds, as described above. The plurality of errors may include an improper identification of a speaker error, a false alarm speech error, a missed speech error, an overlapping speaker error, and/or the like.

As further shown in FIG. 5, process 500 may include selecting a rectification model to rectify each of the plurality of errors based on a cause of a corresponding one of the plurality of errors and based on features of a corresponding one of the plurality of speaker segments (block 525). For example, the device may select a rectification model to rectify each of the plurality of errors based on a cause of a corresponding one of the plurality of errors and based on features of a corresponding one of the plurality of speaker segments, as described above. The rectification model may include a hidden Markov model, a median filtering model, a cluster time-interpolated reconstruction model, a false alarm reduction model, etc.

As further shown in FIG. 5, process 500 may include re-segmenting the audio data with the rectification models to generate re-segmented audio data (block 530). For example, the device may re-segment the audio data with the rectification models to generate re-segmented audio data, as described above. In some implementations, the device may process the audio data with a Viterbi algorithm and/or a Bayesian information criterion (BIC) clustering algorithm to generate the re-segmented audio data.

As further shown in FIG. 5, process 500 may include determining a plurality of modified diarization error rates for the plurality of speaker segments based on the re-segmented audio data (block 535). For example, the device may determine a plurality of modified diarization error rates for the plurality of speaker segments based on the re-segmented audio data, as described above.

As further shown in FIG. 5, process 500 may include selecting one of the plurality of speaker segments based on the plurality of modified diarization error rates (block 540). For example, the device may select one of the plurality of speaker segments based on the plurality of modified diarization error rates, as described above.

In some implementations, the device may calculate an empathy score based on the one of the plurality of speaker segments. For example, the device may calculate an empathy score based on the one of the plurality of speaker segments, as described above. The empathy score may provide an indication of whether one of the plurality of speakers, associated with the empathy score, is empathetic, neutral, or non-empathetic.

In some implementations, the device may calculate an emotion score, for the one of the plurality of speaker segments, based on the re-segmented audio data. In some implementations, the device may process the one of the plurality of speaker segments with a CNN model to calculate the emotion score. The device may convert the re-segmented audio data to text data. The device may calculate an intent score, for the one of the plurality of speaker segments, based on the text data. In some implementations, the device may process the one of the plurality of speaker segments, with an NLP model and/or a cosine similarity model, to calculate the intent score. The device may calculate a sentiment score, for the one of the plurality of speaker segments, based on the text data. In some implementations, the device may process the one of the plurality of speaker segments, with an NLP library, to calculate the sentiment score. The device may calculate the empathy score based on the emotion score, the intent score, and the sentiment score.

As further shown in FIG. 5, process 500 may include performing one or more actions based on the selected speaker segment (block 545). For example, the device may perform one or more actions based on the selected speaker segment, as described above. In some implementations, the device may determine an empathy score based on the selected speaker segment and may perform the one or more actions based on the empathy score.

In some implementations, performing the one or more actions includes providing the empathy score for display, scheduling training for one of the plurality of speakers associated with the empathy score, and/or causing a salary increase or a promotion to be implemented for one of the plurality of speakers associated with the empathy score. Alternatively, and/or additionally, performing the one or more actions includes one or more of causing a reward to be implemented for one of the plurality of speakers associated with the empathy score, causing a refund to be provided to one of the plurality of speakers associated with the empathy score, and/or retraining one or more of the rectification models based on the empathy score.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, audio data identifying a conversation including a plurality of speakers;
processing, by the device, the audio data, with a plurality of clustering models, to identify a plurality of speaker segments;
determining, by the device, a plurality of diarization error rates for the plurality of speaker segments;
identifying, by the device, a plurality of errors in the plurality of speaker segments based on comparing each of the plurality of diarization error rates to one or more thresholds;
selecting, by the device, a rectification model to rectify each of the plurality of errors based on a cause of a corresponding one of the plurality of errors and based on features of a corresponding one of the plurality of speaker segments;
re-segmenting, by the device, the audio data with the rectification models to generate re-segmented audio data;
determining, by the device, a plurality of modified diarization error rates for the plurality of speaker segments based on the re-segmented audio data;
selecting, by the device, a speaker segment, of the plurality of speaker segments, based on the plurality of modified diarization error rates;
calculating, by the device, an empathy score based on an emotion score, an intent score, and a sentiment score determined based on the re-segmented audio data;
retraining, by the device, one or more of the rectification models based on calculating the empathy score and utilizing the empathy score as additional training data; and
performing, by the device, one or more actions based on the speaker segment.

2. The method of claim 1, wherein the plurality of clustering models includes:
a k-means clustering model,
a spectral clustering model,
an agglomerative clustering model, and
an ensemble model.

3. The method of claim 1, further comprising:
calculating the emotion score, for the speaker segment, based on the re-segmented audio data;
converting the re-segmented audio data to text data;
calculating the intent score, for the speaker segment, based on the text data;
calculating the sentiment score, for the speaker segment, based on the text data; and
wherein the one or more actions are performed based on the empathy score.

4. The method of claim 1, wherein processing the audio data, with the plurality of clustering models, to identify the plurality of speaker segments comprises:
processing the audio data, with one or more machine learning models, to extract features from the audio data;
processing the features, with the plurality of clustering models, to generate a list of class labels;
generating timestamp segments based on the list of class labels; and
identifying the plurality of speaker segments based on the timestamp segments.

5. The method of claim 4, wherein the features of the audio data include Mel-frequency cepstral (MFC) coefficients and first order MFC coefficients.

6. The method of claim 4, wherein processing the audio data, with the plurality of clustering models, to identify the plurality of speaker segments comprises:

reducing a quantity of the features extracted from the audio data.

7. The method of claim 1, wherein re-segmenting the audio data with the rectification models to generate the re-segmented audio data comprises one or more of:
processing the audio data, with a hidden Markov model, to generate the re-segmented audio data;
processing the audio data, with a median filtering model, to generate the re-segmented audio data;
processing the audio data, with a cluster time-interpolated reconstruction model, to generate the re-segmented audio data; or
processing the audio data, with a false alarm reduction model, to generate the re-segmented audio data.

8. A device, comprising:
one or more memories; and
one or more processors, communicatively coupled to the one or more memories, configured to:
receive audio data identifying a conversation including a plurality of speakers;
process the audio data, with a plurality of clustering models, to identify a plurality of speaker segments, wherein the plurality of clustering models includes a k-means clustering model, a spectral clustering model, and an agglomerative clustering model;
determine a plurality of diarization error rates for the plurality of speaker segments;
identify a plurality of errors in the plurality of speaker segments based on comparing each of the plurality of diarization error rates to a threshold;
select a rectification model to rectify each of the plurality of errors based on a cause of a corresponding one of the plurality of errors and based on features of a corresponding one of the plurality of speaker segments;
re-segment the audio data with the rectification model to generate re-segmented audio data;
determine a plurality of modified diarization error rates for the plurality of speaker segments based on the re-segmented audio data;
select one of the plurality of speaker segments based on the plurality of modified diarization error rates;
calculate an empathy score based on the one of the plurality of speaker segments and based on an emotion score, an intent score, and a sentiment score determined based on the re-segmented audio data;
retrain the rectification model based on calculating the empathy score and utilizing the empathy score as additional training data; and
perform one or more actions based on the empathy score.

9. The device of claim 8, wherein the plurality of errors includes one or more of:
an improper identification of a speaker error,
a false alarm speech error,
a missed speech error, or
an overlapping speaker error.

10. The device of claim 8, wherein the one or more processors, when calculating the empathy score, are configured to:
process the one of the plurality of speaker segments, with a convolutional neural network model, to calculate the emotion score;
process the one of the plurality of speaker segments, with a natural language processing model and a cosine similarity model, to calculate the intent score; and
process the one of the plurality of speaker segments, with a natural language processing library, to calculate the sentiment score.

11. The device of claim 8, wherein the empathy score provides an indication of whether one of the plurality of speakers, associated with the empathy score, is empathetic, neutral, or non-empathetic.

12. The device of claim 8, wherein the one or more processors, when performing the one or more actions, are configured to one or more of:
provide the empathy score for display;
schedule training for one of the plurality of speakers associated with the empathy score; or
cause a salary increase or a promotion to be implemented for one of the plurality of speakers associated with the empathy score.

13. The device of claim 8, wherein the one or more processors, when performing the one or more actions, are configured to one or more of:
cause a reward to be implemented for one of the plurality of speakers associated with the empathy score; or
cause a refund to be provided to one of the plurality of speakers associated with the empathy score.

14. The device of claim 8, wherein the rectification model includes one or more of:
a hidden Markov model,
a median filtering model,
a cluster time-interpolated reconstruction model, or
a false alarm reduction model.

15. A non-transitory computer-readable medium storing a set of instructions, the set of instructions comprising:
one or more instructions that, when executed by one or more processors of a device, cause the device to:
receive audio data identifying a conversation including a plurality of speakers;
process the audio data, with a plurality of clustering models, to identify a plurality of speaker segments;
determine a plurality of diarization error rates for the plurality of speaker segments;
identify a plurality of errors in the plurality of speaker segments based on comparing each of the plurality of diarization error rates to a threshold;
select a rectification model to rectify each of the plurality of errors based on a cause of a corresponding one of the plurality of errors and based on features of a corresponding one of the plurality of speaker segments;
re-segment the audio data with the rectification models to generate re-segmented audio data;
determine a plurality of modified diarization error rates for the plurality of speaker segments based on the re-segmented audio data;
select one of the plurality of speaker segments based on the plurality of modified diarization error rates;
calculate an emotion score based on the re-segmented audio data and based on the one of the plurality of speaker segments;
convert the re-segmented audio data, for the one of the plurality of speaker segments, to text data;
calculate an intent score based on the text data;
calculate a sentiment score based on the text data;
calculate an empathy score based on the emotion score, the intent score, and the sentiment score;
retrain one or more of the rectification models based on calculating the empathy score and utilizing the empathy score as additional training data; and perform one or more actions based on the empathy score.

16. The non-transitory computer-readable medium of claim 15, wherein the one or more instructions, that cause the device to process the audio data, with the plurality of clustering models, to identify the plurality of speaker segments, cause the device to:
    process the audio data, with one or more machine learning models, to extract features from the audio data;
    reduce a quantity of the features extracted from the audio data to generate reduced features;
    process the reduced features, with the plurality of clustering models, to generate a list of class labels;
    generate timestamp segments based on the list of class labels; and
    identify the plurality of speaker segments based on the timestamp segments.

17. The non-transitory computer-readable medium of claim 15, wherein the one or more instructions, that cause the device to re-segment the audio data with the rectification models to generate the re-segmented audio data, cause the device to one or more of:
    process the audio data, with a Viterbi algorithm, to generate the re-segmented audio data; or
    process the audio data, with a Bayesian information criterion clustering algorithm, to generate the re-segmented audio data.

18. The non-transitory computer-readable medium of claim 15, wherein the plurality of errors includes one or more of:
    an improper identification of a speaker error,
    a false alarm speech error,
    a missed speech error, or
    an overlapping speaker error.

19. The non-transitory computer-readable medium of claim 15, wherein the empathy score provides an indication of whether one of the plurality of speakers, associated with the empathy score, is empathetic, neutral, or non-empathetic.

20. The non-transitory computer-readable medium of claim 15, wherein the one or more instructions, that cause the device to perform the one or more actions, cause the device to one or more of:
    provide the empathy score for display;
    schedule training for one of the plurality of speakers associated with the empathy score;
    cause a salary increase or a promotion to be implemented for one of the plurality of speakers associated with the empathy score;
    cause a reward to be implemented for one of the plurality of speakers associated with the empathy score; or
    cause a refund to be provided to one of the plurality of speakers associated with the empathy score.

* * * * *